United States Patent [19]

Caron et al.

[11] Patent Number: 5,265,464
[45] Date of Patent: Nov. 30, 1993

[54] PRODUCTION LINE O-RING TEST APPARATUS FOR A MASS AIR FLOW SENSOR

[75] Inventors: Richard W. Caron, Canton, Mich.; Breck G. Dean, Telford; Dean C. Newswanger, Lebanon, both of Pa.

[73] Assignee: Ford Motor Company, Dearborn, Mich.

[21] Appl. No.: 941,331

[22] Filed: Sep. 4, 1992

[51] Int. Cl.⁵ .............................................. G01M 3/08
[52] U.S. Cl. ............................................ 73/46; 73/37
[58] Field of Search .................................. 73/46, 37, 3

[56] References Cited

U.S. PATENT DOCUMENTS

| | | | |
|---|---|---|---|
| 4,019,371 | 4/1977 | Chaplin et al. | 73/46 |
| 4,346,591 | 8/1982 | Evans | 73/46 |
| 4,691,276 | 9/1987 | Miller et al. | 73/46 |
| 4,805,443 | 2/1989 | Schroeder | 73/37 |
| 4,888,979 | 12/1989 | Steeper | 73/46 |

*Primary Examiner*—Hezron E. Williams
*Assistant Examiner*—Valerie Francies
*Attorney, Agent, or Firm*—Roger L. May; Peter Abolins

[57] ABSTRACT

An O-ring test apparatus for a mass air flow sensor having a lift mechanism for lifting the mass air flow sensor and its production line carrier from the production line to a test location. In the test location, a clamping mechanism clamps the mass air flow sensor to the carrier compressing the O-ring. A seal mechanism blocks one end of an air flow passage provided in the production line carrier and connects an air inlet member to the other end. The air inlet member is connected by a manifold to a source of pressurized air through a solenoid valve. A pressure sensor connected to the manifold generates at least a first pressure signal in the manifold which rises to a pressure indicating that the O-ring is properly mounted on the mass air flow sensor. A control circuit activates the lift mechanism, the seal mechanism and the solenoid valve in a predetermined sequence and generates a fail signal in the absence of the first pressure signal when the solenoid value is open.

12 Claims, 3 Drawing Sheets

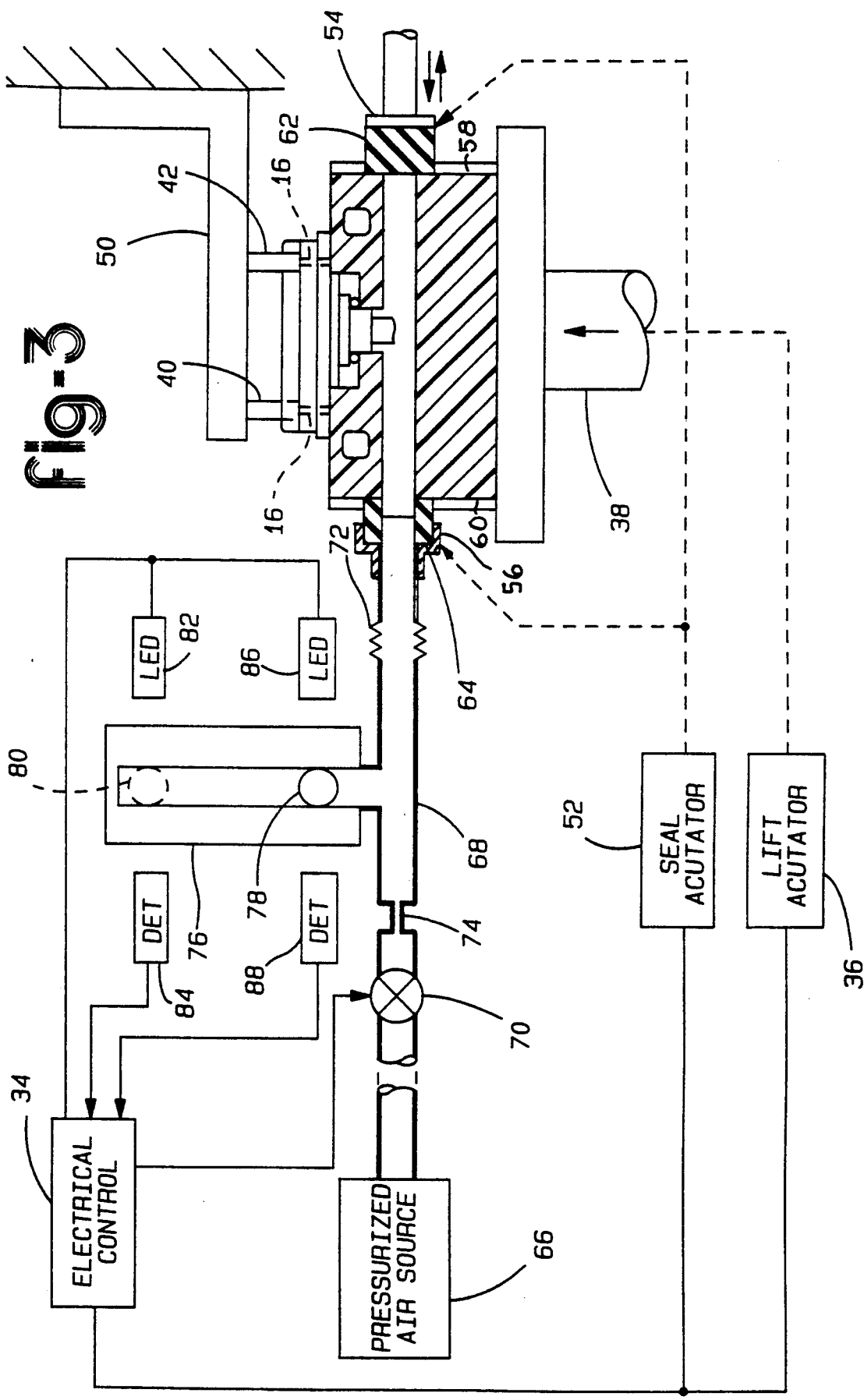

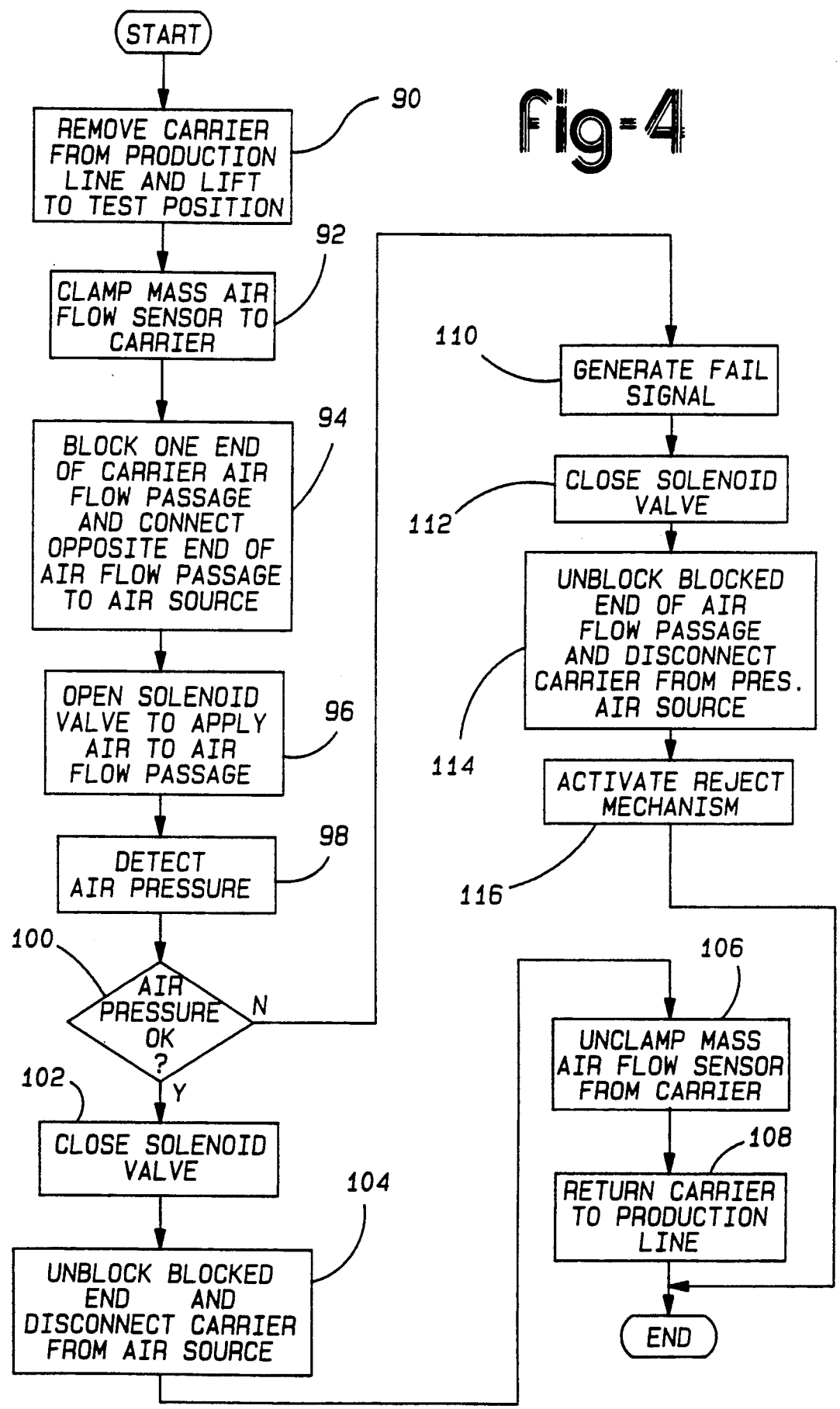

PRODUCTION LINE O-RING TEST APPARATUS FOR A MASS AIR FLOW SENSOR

TECHNICAL FIELD

The invention is related to the field of mass air flow sensors, and in particular to an O-ring test apparatus for testing on an automated production line, for the existence of an O-ring on the mass air flow sensor.

BACKGROUND ART

In its intended use, the mass air flow sensor has an O-ring circumscribing the sensing head which seals the mass air flow sensor in the mounting port through which the sensor head is inserted into an air flow passage whose mass air flow is to be measured. If this O-ring is missing, air will leak through the mounting port and will adversely affect the mass air flow measured by the mass air flow sensor. Current production techniques require a visual inspection of the mass air flow sensor to determine that an O-ring has been properly installed. With the automation of the mass air flow sensor production, a variety of test and calibration procedures which require calibrated air flows are automatically executed. The absence of the O-ring will result in improper calibration of the mass air flow sensor and cause the sensor to fail the required test.

To eliminate these problems, disclosed herein is a production line O-ring test apparatus capable of automatically and quickly detecting the absence of the O-ring on the mass air flow sensor.

SUMMARY OF THE INVENTION

The invention is an O-ring test apparatus for use in the assembly and test of a mass air flow sensor on a production line. The O-ring test apparatus has the advantage that O-ring testing is performed directly on the production line without having to remove the mass air flow sensor from its production line carrier. Another advantage is the O-ring test is performed automatically eliminating the requirement for a visual inspection. Still another advantage of the O-ring test apparatus is that the test is conducted under conditions simulating the structure to which the mass airflow sensor will be mounted in actual use.

On the production line, the mass air flow sensor is mounted on the top surface of a production line carrier. The production line carrier has a well simulating the mounting port of the mass air flow sensor in its intended application and a transverse air flow passage simulating the air flow passage whose mass air flow is to be measured. The O-ring of the mass air flow sensor circumscribes the sensing head and engages the bottom of the well.

The O-ring test apparatus has a lift mechanism which lifts the carrier and the mass air flow sensor mounted thereon from the production line to a test location. A clamping mechanism, responsive to the lifting of the carrier to the test position clamps the base of the mass air flow sensor to the top of the carrier compressing the O-ring against the bottom of the well.

The O-ring test apparatus further has a source of pressurized air and a seal mechanism. The seal mechanism displaces a seal member to block one end of the carrier's air flow passage and to connect an air input member to the other end of the carrier's air flow passage. An air manifold connects the source of pressurized air to the air input member. The air flow to the carrier through the air manifold is controlled by a solenoid valve. A pressure sensor is connected to the air manifold intermediate the solenoid valve and the carrier and generates a pressure signal in response to the air pressure in the air manifold downstream of the solenoid valve having a predetermined value when the solenoid valve is open. The predetermined value of the detected pressure being a minimum value obtained when the O-ring is present.

An electrical control generates the signals required to actuate the lift mechanism, the seal mechanism and the solenoid valve in a predetermined sequence. The electrical control is also responsive to the pressure sensor not generating the first pressure signal after the solenoid valve is opened to generate a fail signal.

In the preferred embodiment, the pressure sensor also generates a second pressure signal in response to a second predetermined pressure after the solenoid valve is opened. The second predetermined pressure corresponding to the pressure in the air manifold when the O-ring is missing. In the preferred embodiment, the electrical control is further responsive to the second pressure signal in conjunction with the absence of the first pressure signal to generate the fail signal.

The details of the O-ring test apparatus and other advantages will become more apparent from the reading of the specification in conjunction with the drawings.

BRIEF DESCRIPTION OF THE DRAWINGS

FIG. 3 is a detailed block diagram of the O-ring test apparatus.

FIG. 4 is a flow diagram of the operation of the O-ring test apparatus.

BEST MODE FOR CARRYING OUT THE INVENTION

Figure 1:
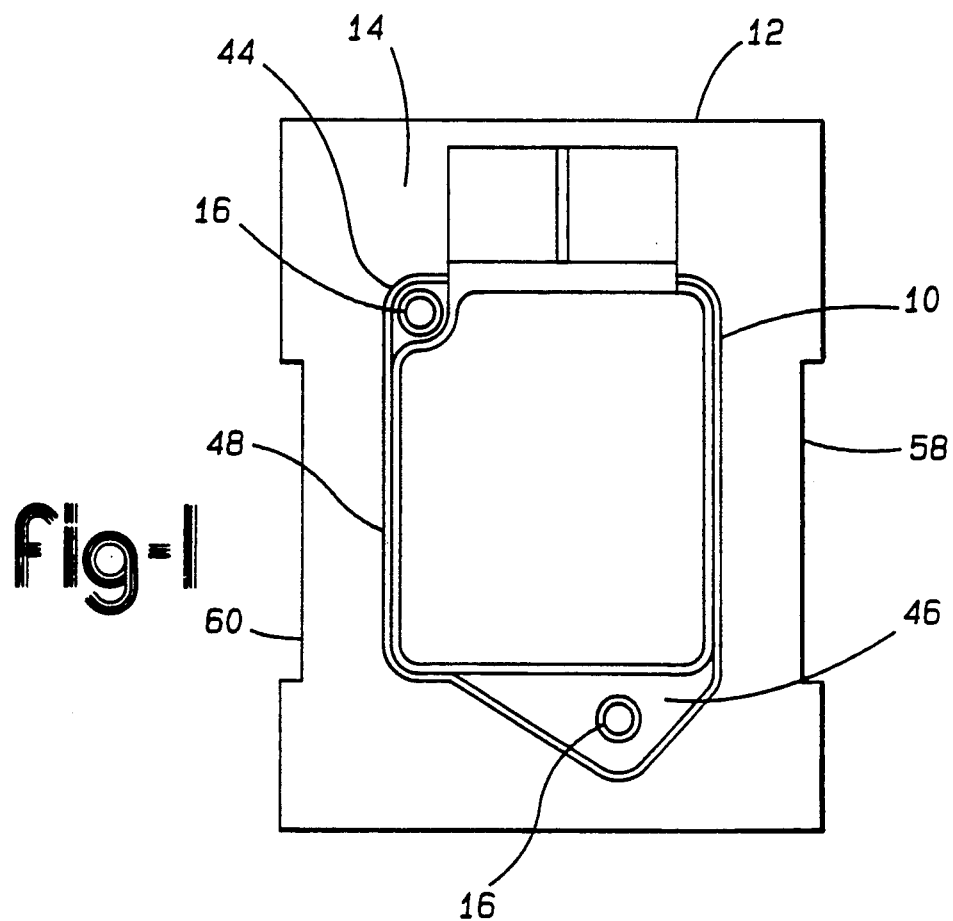
FIG. 1 is a top view of the mass air flow sensor mounted on a production line carrier.
Figure 2:
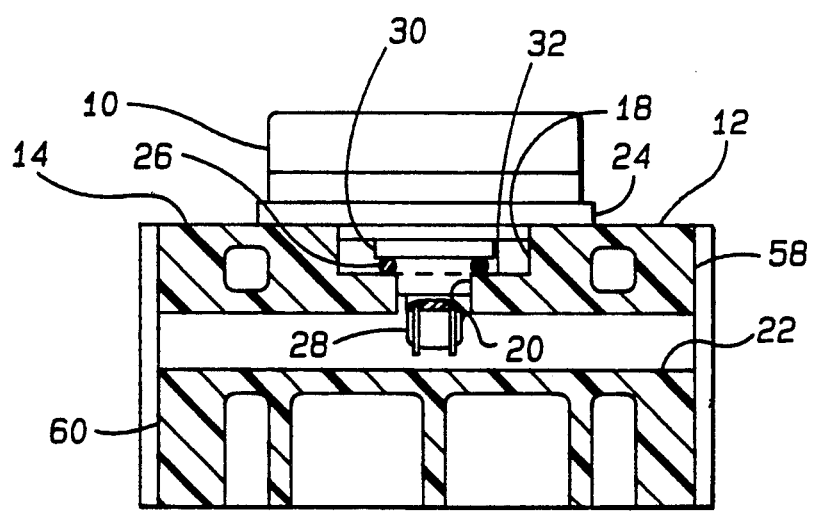
FIG. 2 is a cross-sectional side view of the mass air flow sensor mounted on a production line carrier.

In the assembly, test and calibration of a mass air flow sensor 10, on an automated production line, the mass air flow sensor 10 is mounted on a carrier 12 as shown in FIGS. 1 and 2. The carrier 12 has a top mounting surface 14 and includes two alignment pins 16. The alignment pins 16 accurately position the base 24 of the mass air flow sensor 10 on the carrier 12 relative to a well 18, and guide aperture 20. The carrier 12 also has a transverse air flow passage 22 which intersects the guide aperture 20. The air flow passage 22 is spaced from the top mounting surface 14 so that the sensing elements of the mass air flow sensor 12 are centrally positioned in the air flow passage 22.

The depth of the well 18 is selected such that when the mounting base 24 of the mass air flow sensor rests on the top mounting surface 14 of the carrier 12, the O-ring 26 circumscribing the sensing head 28 is compressed between the collar 30 of the sensing head 28 and the bottom 32 of the well 18 sealing the region between the collar 30 and the bottom of the well 18 which circumscribes the guide aperture 20.

Referring now to FIG. 3, there is shown a test apparatus for automatically testing the mass air flow sensor for the existence of the O-ring 26 circumscribing the sensing head 28. Under the control of an electrical control 34, a lift actuator 36 actuates a lifting mechanism, indicated by piston 38 to lift the carrier 12 and the attached mass air flow sensor 10 from the production line (not shown) and to place it in a test position. As the carrier 12 is lifted to the test position, a pair of clamp members, indicated by posts 40 and 42 engage the mounting flanges 44 and 46 respectively of the housing 48 of the mass air flow sensor 10 in the vicinity of the alignment pins 16 and compress the O-ring 26 between the collar 30 and the bottom 32 of the well 18 thereby sealing the region between the sensing head and the bottom of the well 18. The posts 40 and 42 may be mounted to a common base 50 which is stationary relative to the lifting mechanism 36. Preferably, the posts are resiliently mounted to prevent deformation of or other damage to the mounting flanges on the mass air flow sensor's housing assembly.

After compressing the O-ring 26, a seal actuator 52 is actuated by the electrical control 34 to move a seal member 54 and an air input member 56 to engage the sealing surfaces 58 and 60 of the carrier 12. Preferably, the seal member 54 and the air input member 56 move simultaneously towards each other to eliminate the application of lateral forces on the carrier. The sealing member 54 includes a solid resilient seal 62 which occludes one end of the air flow passage 22 when it engages the sealing surface 58. The air input member 56 has an annular shaped resilient member 64 which circumscribes the end of the air flow passage 22 of the carrier when it engages the sealing surface 60. The air input member 56 is connected by a manifold 68 to a source of pressurized air 66 as shown. A valve such as solenoid actuated valve 70, controlled by the electrical control 34, is opened after the sealing member 54 and the air input member 56 are engaged with the sealing surfaces 58 and 60, respectively. A resilient member, such as bellows 72, permit the air input member to be displaced to and from the sealing surface 60 of the carrier.

A constriction 74 is placed in the manifold 68 to limit the air flow rate. The size of the constriction is selected such that when the end of the air flow passage is blocked by the seal member 54 and the O-ring 26 is compressed at the bottom of the well 18, blocking any leakage air flow through the guide aperture 20, the pressure in the air manifold 68 will rise rapidly towards the pressure of the air provided by the pressurized air source 66. However, if the O-ring 26 is missing or is faulty, air will leak through the clearance aperture 20 of the carrier producing a significant pressure drop across the constriction 74.

The pressure in the air manifold 68 between the constriction 74 and the carrier 12 is measured by a pressure sensor, illustrated by manometer 76. The manometer has a ball float 78, the position of which is indicative of the pressure in the air flow passage 22 and in the air manifold 68 to which it is connected. If the O-ring effectively seals the region between the sensor head 28 and the bottom of the well 18, the air pressure in the air manifold 68 downstream of the constriction 74 will rise rapidly towards the pressure of the source of pressurized air causing the ball float 78 to rise towards the top of the manometer 76 as indicated in phantom by ball 80. The passing of the ball float as the pressure in the air conduit reaches a predetermined value can be detected photooptically using a light source, such a light emitting diode (LED) 82 and a photo detector 84. The ball float 78 as it rises in the manometer will occlude the light beam emitted by the light emitting diode 82 from the photodetector 84, and the photodetector 84 in response to being occluded by the passing of the ball float will generate a signal to the electrical control 34 signifying that the O-ring 26 has effectively sealed the space between the mass air flow sensor and the bottom 32 of the well 18.

In a like manner, if the O-ring 26 is missing, the pressure in the manifold 68 will not rise and will remain close to atmospheric pressure. The ball float 78 will, therefore, remain near the bottom of the manometer in the position indicated. A second light emitting diode may be located adjacent to the lower position of the ball float 78 and a second photodetector 88 may be positioned so that it is occluded by the ball float 78 when it is in the lower position. When the solenoid valve 70 is opened and the second photodetector 88 is occluded by the ball float 78, it will generate a signal transmitted to the electrical control 34 indicating that the O-ring 26 is missing.

In response to receiving a signal from the first photodetector 84, the electrical control will deactivate the solenoid valve 70 terminating the air flow from the source of pressurized air 66 to the carrier 12. The seal actuator 52 is then deactivated withdrawing the seal member 54 and the air input member 56 from the sealing surfaces 58 and 60, respectively. Finally, the electrical control will deactivate the lift actuator 36 causing the lifting mechanism 38 to return the carrier 12 and the mass air flow sensor to the production line. The total sequence for the O-ring test apparatus to conduct the O-ring test takes approximately four seconds.

In response to receiving a signal from the second photodetector 88 signifying the O-ring 26 is either missing or a good seal was not effected and the absence of a signal generated by photodetector 84, the electrical control 32 will generate a fail signal. This fail signal may be used to activate a reject system, not shown, which will remove the faulty mass air flow sensor and its associated carrier from the production line. Alternatively, the electrical controller 34 may in response to receiving a signal from the second detector 88 deactivate the solenoid valve 70, deactivate actuator 52 to withdraw the seal member 54 and air input member 56 from the associated sealing surfaces 58 and 60, respectively. The electrical control 34 will then generate a failure signal and terminate all subsequent operations and wait for an operator to remove the faulty mass air flow sensor and carrier from the test apparatus.

FIG. 4 is a flow diagram showing the sequence of operations performed by the test apparatus to detect the existence of the O-ring on the mass air flow sensor. The procedure starts by activating the lift actuator 36 causing the lift mechanism 38 to remove the carrier from the production line and lift it to the test position as indicated by block 90. In the test position, the posts 40 and 42 engage the top of the mass air flow sensor and clamp the base 24 of the air flow sensor to the carrier compressing the O-ring 26 as indicated by block 92. After the carrier is lifted to the test position, the seal actuator 52 is actuated causing the sealing member 54 to block one end of the air flow passage 22 and the air input member 56 to be connected to the other end of the air flow passage as indicated by block 94. After the air input member is connected to the air flow passage, the solenoid valve 70 is activated to its open position, as indicated by block 96, to apply pressurized air to the air flow passage 22 of the carrier 12. The air pressure is then detected by the pressure sensor 76 in conjunction with photodetectors 84 and 88 as indicated by block 98, then the logic circuit of the electrical control 34 asks if the air pressure is OK, as indicated by decision block 100, indicating that a signal has been transmitted by detector 84 indicating that the O-ring seal is in place and is effectively blocking any air flow out of the carrier through the guide aperture 20.

When the air pressure is OK, the electrical control will close the solenoid valve, block 102, unblock the blocked end of the air flow passage and disconnect the carrier from the air source, block 104. The lowering of the lift mechanism will automatically unclamp the mass air flow from the carrier block 106, and return the carrier to the production line block 108, ending the test, and verifying that the O-ring has been mounted on the main air flow sensor.

Returning to block 100, if the air pressure is not OK, the electrical control will generate a fail signal, block 110, close the solenoid valve 70, block 112 then unblocks the blocked end of the air flow passage and disconnect the carrier from the air source, block 114. In the preferred embodiment, the fail signal will activate a reject mechanism (not shown) effectively removing the failed mass air sensor from the production line. The reject mechanism may inhibit the return of the failed mass air flow from the production line or alternatively, may be located downstream of the O-ring test apparatus where it is removed from the production line or otherwise tagged as faulty.

Having described the invention with respect to a specific embodiment shown in the drawings, it is not intended that the invention be limited to the specific embodiment shown. It is recognized that those skilled in the art may make changes or improvements within the scope of the invention as set forth in the appended claims.

We claim:

1. An O-ring test apparatus for a mass air flow sensor mounted on a production line carrier, the production line carrier having a top surface, a well provided in the top surface which receives the sensing head of the mass air flow sensor, and a transverse air flow passage connected to the well in which is disposed the end of the sensing head, said mass air flow sensor having an O-ring sealingly engageable with the bottom of the well, said O-ring test apparatus comprising:
   a lift mechanism responsive to a first signal to lift said carrier with said mass air sensor mounted thereon from a production line to a test location and responsive to a second signal to return said carrier and said mass air flow sensor to said production line;
   a clamping mechanism responsive to said carrier being placed in said test position to clamp said mass air flow sensor to said top of said carrier compressing said O-ring;
   a seal mechanism responsive to a third signal to block one end of said air flow passage with a seal member and to connect an air input member to an opposite end of said air flow passage, said seal mechanism responsive to a fourth signal to unblock said one end of said air flow passage and disconnect said air input member from said other end of said air flow passage;
   an air manifold connecting said air input member to a source of pressurized air;
   a valve connected to said air manifold between said source of pressurized air and said carrier to control the air flow through said air manifold, said valve switchable to an open position in response to a fifth signal;
   a pressure sensor connected to said air manifold intermediate said valve and said carrier for generating at least a first pressure signal when the air pressure in said air manifold has a first predetermined value indicating the presence of an O-ring sealing the space between said mass air flow sensor and said bottom of said well; and
   an electronic control for generating said first, second, third, fourth and fifth signals in a predetermined sequence and responsive to said first pressure signal to return said carrier to said production line and for generating a failure signal in response to the absence of said pressure sensor to generate said first pressure signal.

2. The O-ring test apparatus of claim 1 wherein said pressure sensor generates a second pressure signal in response to a second predetermined pressure value indicative of the absence of said O-ring on said mass air flow sensor and wherein said electrical control is further responsive to said second pressure signal in conjunction with said first pressure signal to generate said fail signal.

3. The O-ring test apparatus of claim 1 wherein said pressure sensor comprises:
   a manometer having a ball float;
   a light source generating a light beam passing through said manometer at a height corresponding to said first predetermined pressure; and
   a photodetector responsive to said first light beam, said photodetector generating said first pressure signal in response to said ball float occluding said light beam as said ball float rises to at least said predetermined height in response to the opening of said valve.

4. The O-ring test apparatus of claim 2 wherein said pressure sensor comprises:
   a manometer having a ball float;
   a first light source generating a first light beam passing through said manometer at a first height corresponding to said first predetermined pressure;
   a first photodetector responsive to said first light beam being occluded by said ball float after said valve is opened to generate said first pressure signal;
   a second light source generating a second light beam passing through said manometer at a second height corresponding to said second predetermined pressure; and
   a second photodetector responsive to said second light beam being occluded by said ball float after said valve is opened to generate said second pressure signal.

5. The O-ring test apparatus of claim 1 wherein said carrier has a recessed sealing surface provided at each end of said air flow passage and wherein said seal member engages said recessed sealing surface provided at said one end of said air flow passage and said air input member engages said recessed sealing surface provided at said other end of said air flow passage.

6. A production line O-ring test apparatus for a mass air flow sensor having an O-ring engageable with the bottom of a well provided in a production line carrier, said O-ring test apparatus comprising:
   means for lifting said production line carrier to a test position in response to a first signal;

clamping means for clamping said mass air flow sensor to a top surface of said carrier to compress said O-ring against said bottom of said well;

sealing means responsive to a second signal to displace a seal member to seal one end of an air flow passage provided through said carrier and to displace an air input member to engage said carrier at the other end of said air flow passage, said air flow passage connected to said bottom of said well in a region circumscribed by said O-ring;

a manifold providing pressurized air to said air input member;

a valve for controlling the air flow through said manifold in response to a third signal;

pressure sensor means for detecting the pressure in said manifold intermediate said valve and said air input member to generate a first signal when the pressure in said manifold has a value greater than a first predetermined value corresponding to the pressure in said manifold when said mass air flow sensor has an O-ring; and electrical control means for generating said first, second and third signals in a predetermined sequence, said electrical control means further responsive to said pressure sensor means failing to generate said first pressure signal to generate a fail signal indicating the absence of said O-ring from said mass air flow sensor.

7. The O-ring test apparatus of claim 6 wherein said pressure sensor means further includes means for generating a second signal when the pressure in said manifold has a value equal to a second predetermined value corresponding to the pressure in said manifold when said mass air flow sensor does not have an O-ring.

8. A method for production testing a mass air flow sensor for the existence of its O-ring seal, the mass air flow sensor being mounted on a production line carrier having a top surface, a sensor head well having a bottom surface engageable by the O-ring to form a seal, and an air flow passage passing through said carrier and connected to the well in a region circumscribed by the O-ring, said method comprising the steps of:

lifting said carrier with said mass air flow sensor from a production line to a test position;

engaging clamping members at the terminal portion of said step of lifting to compress said O-ring against said bottom of said well;

displacing a seal member to block one end of said air flow passage;

displacing an air input member to engage said carrier at an opposite end of said air flow passage;

providing pressurized air to said air flow passage through said air input member;

detecting a pressure corresponding to the pressure in said air flow passage to generate at least a first pressure signal when said pressure is greater than a first predetermined pressure having a value indicating that said mass air flow sensor has an O-ring; and generating a "fail" signal in response to providing pressurized air to said air flow passage and the absence of said first pressure signal.

9. The method of claim 8 wherein said step of detecting a pressure further comprises the step of detecting a second pressure in said air flow passage to generate a second pressure signal when said second pressure is equal to a second predetermined value indicating said mass air flow sensor does not have an O-ring and wherein said step of generating a fail signal is further responsive to said second pressure signal in conjunction with the absence of said first pressure signal to generate said fail signal.

10. The method of claim 8 wherein said carrier has a sealing surface adjacent each end of said air flow passage, said step of displacing said seal member displaces said seal member to engage said sealing surface provided at said one end of said air flow passage.

11. The method of claim 10 wherein said air input member has an air inlet aperture, said step of displacing said air inlet member to engage said sealing surface provided at said opposite end with said air inlet aperture substantially concentric with said air flow passage.

12. The method of claim 8 wherein said carrier has a pair of alignment pins provided on its top surface for aligning said mass air flow sensor on said carrier during assembly and test and wherein said step of engaging clamping members engages a housing member of said mass air flow sensor adjacent to said alignment pins.

* * * * *